Oct. 10, 1961 H. H. MUELLER 3,003,771

AUTOMATIC RECORD PLAYER

Original Filed July 10, 1953 5 Sheets-Sheet 1

Herman H. Mueller
INVENTOR.

BY Clarence A. O'Brien
and Harvey B. Jacobson
Attorneys

Herman H. Mueller
INVENTOR.

BY Clarence A. O'Brien
and Harvey B. Jacobson
Attorneys

Oct. 10, 1961 H. H. MUELLER 3,003,771

AUTOMATIC RECORD PLAYER

Original Filed July 10, 1953 5 Sheets-Sheet 3

Herman H. Mueller
INVENTOR.

BY Clarence A. O'Brien
and Harvey B. Jacobson
Attorneys

Oct. 10, 1961 H. H. MUELLER 3,003,771

AUTOMATIC RECORD PLAYER

Original Filed July 10, 1953 5 Sheets-Sheet 4

Herman H. Mueller
INVENTOR.

BY Clarence A. O'Brien
and Harvey B. Jacobson
Attorneys

Oct. 10, 1961 H. H. MUELLER 3,003,771

AUTOMATIC RECORD PLAYER

Original Filed July 10, 1953 5 Sheets-Sheet 5

Herman H. Mueller
INVENTOR.

BY Clarence A. O'Brien
and Harvey B. Jacobson
Attorneys

United States Patent Office 3,003,771

Patented Oct. 10, 1961

3,003,771

AUTOMATIC RECORD PLAYER

Herman H. Mueller, Ephrata, Pa.; Elizabeth M. Mentzer, executrix of said Herman H. Mueller, deceased

Original application July 10, 1953, Ser. No. 367,316, now Patent No. 2,841,400, dated July 1, 1958. Divided and this application Nov. 4, 1954, Ser. No. 476,731

1 Claim. (Cl. 274—10)

This invention is a division of my prior copending application Serial No. 367,316, filed July 10, 1953 which has now matured into Patent No. 2,841,400 of July 1, 1958, and comprises novel and useful improvements in a tone arm control for playing intermixed records of various standard sizes and speeds of rotation, and more specifically relates to a tone arm and has associated therewith an indexing means for gauging or detecting the size of a record in an intermixed stack containing records of several different sizes, and in response to such detection properly positioning the tone arm at the beginning of the sound track for playing that record, and all in a fully automatic manner and selectively in one of a variety of sequences of automatic playing.

The primary object of this invention is to provide a tone arm control mechanism whereby the tone arm will be properly and automatically positioned for playing, in turn, each record of an intermixed stack containing two or more different sizes of records.

These together with other objects and advantages which will become subsequently apparent reside in the detail of construction and operation as more fully hereinafter described and claimed, reference being had to the accompanying drawings forming a part hereof, wherein like numerals refer to like parts throughout, and in which:

Automatic record players of the type with which the present invention is primarily concerned have a movement for imparting horizontal swinging motion to the tone arm for moving the tone arm between a rest position at one side of the record and a playing position upon the record, for causing the tone arm to actuate the associated record changer mechanism of the record player, upon completion of the playing of a record; a movement for imparting vertical movement to the tone arm; and in some instances, a movement for imparting tilting motion to the tone arm. These movements are operated in timed relation to each other to enable the tone arm to perform its various motions and functions during its operation.

The construction as disclosed in this application includes features which are disclosed now specifically and claimed in one or more of my following patents: 2,559,786; 2,729,455; 2,809,841; 2,809,842; 2,860,880; 2,809,843; 2,776,837; 2,776,838; 2,837,337; 2,841,400; 2,900,192; 2,809,840; 2,949,307; 2,983,490; 2,949,310.

*General organization*

The automatic record player and changer illustrated in the accompanying drawings if of the dual record type, and includes a cabinet or casing 10 having top and bottom walls 12 and 14. Rotatably mounted upon the top of the cabinet is a turntable 16 which may be of any suitable construction and mounting, and is driven in any desired manner from a unidirectional constant speed motor, not shown.

Figures 1, 2:
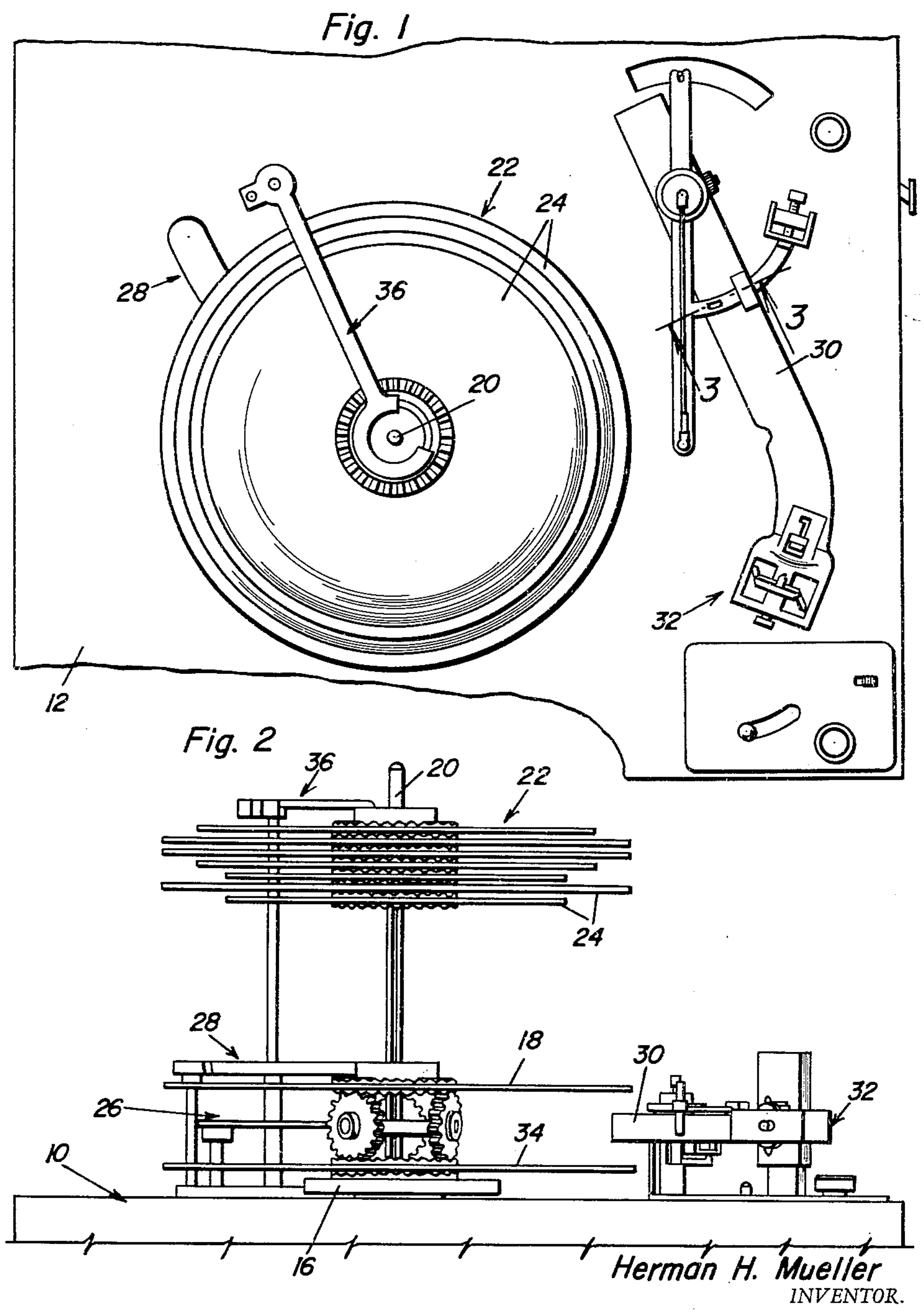
FIGURE 1 is a fragmentary top plan view of a phonograph record player including a tone arm.
FIGURE 2 is a fragmentary side elevational view of a phonograph record player in accordance with FIGURE 1, the parts being in the position shown in FIGURE 1 and being positioned for the second of three manners of automatically playing records.
Figure 7:
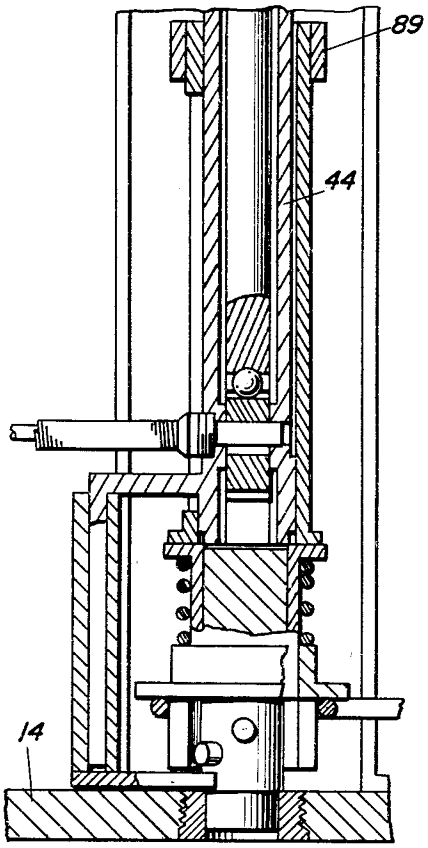
FIGURE 7 is a fragmentary view partly in vertical section and partly in elevation of a portion of FIGURE 6 taken upon an enlarged scale substantially upon the plane of the section line 7—7 of FIGURE 6.

There is further illustrated a stationary spindle 20 having means for supporting a stack 22 of intermixed records 24 of different sizes to be released successfully in any desired manner from the stack for playing. These records are preferably of the interlocking non-slipping type. A record supporting and driving assembly 26 is shown in FIGURE 2. The assembly 26 serves to support a record 18 above the turntable and to drive the record from the turntable but in the opposite direction of rotation to permit the tone arm to play the underside of the record.

The pressure arm assembly 28 is employed to maintain the record 18 being played in firm non-slipping contact with the means 26, the turntable 16 or the records 34 carried by the turntable. A tone arm 30 includes a needle changer assembly 32 and a tone arm support post of a particular construction to be set forth hereinafter. Also, illustrated in the drawings, is a stack weight assembly 36.

Both the vertical and horizontal movements actuate the tone arm by an operative connection with the tone arm support post.

The horizontal and vertical movements are operated by the motor, not shown, in proper correlation to each other and to the other movements of the record player by the mechanism or movements to be described fully hereinafter.

*Tone arm mounting and support*

A novel mounting and support structure is provided for the tone arm whereby the latter may be reciprocated vertically under the control of the vertical movement; may be tilted about a horizontal axis under the control of the tilting movement; and may be rotated horizontally about a vertical axis by the horizontal movement.

Figure 3:
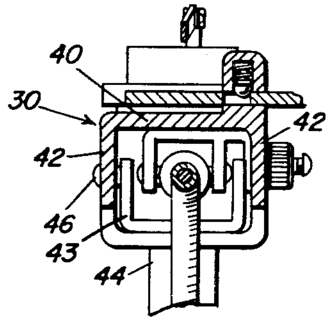
FIGURE 3 is a detail view taken upon an enlarged scale in vertical transverse section substantially upon the plane indicated by the section line 3—3 of FIGURE 1 and showing certain structural features of the tone arm.
Figure 6:
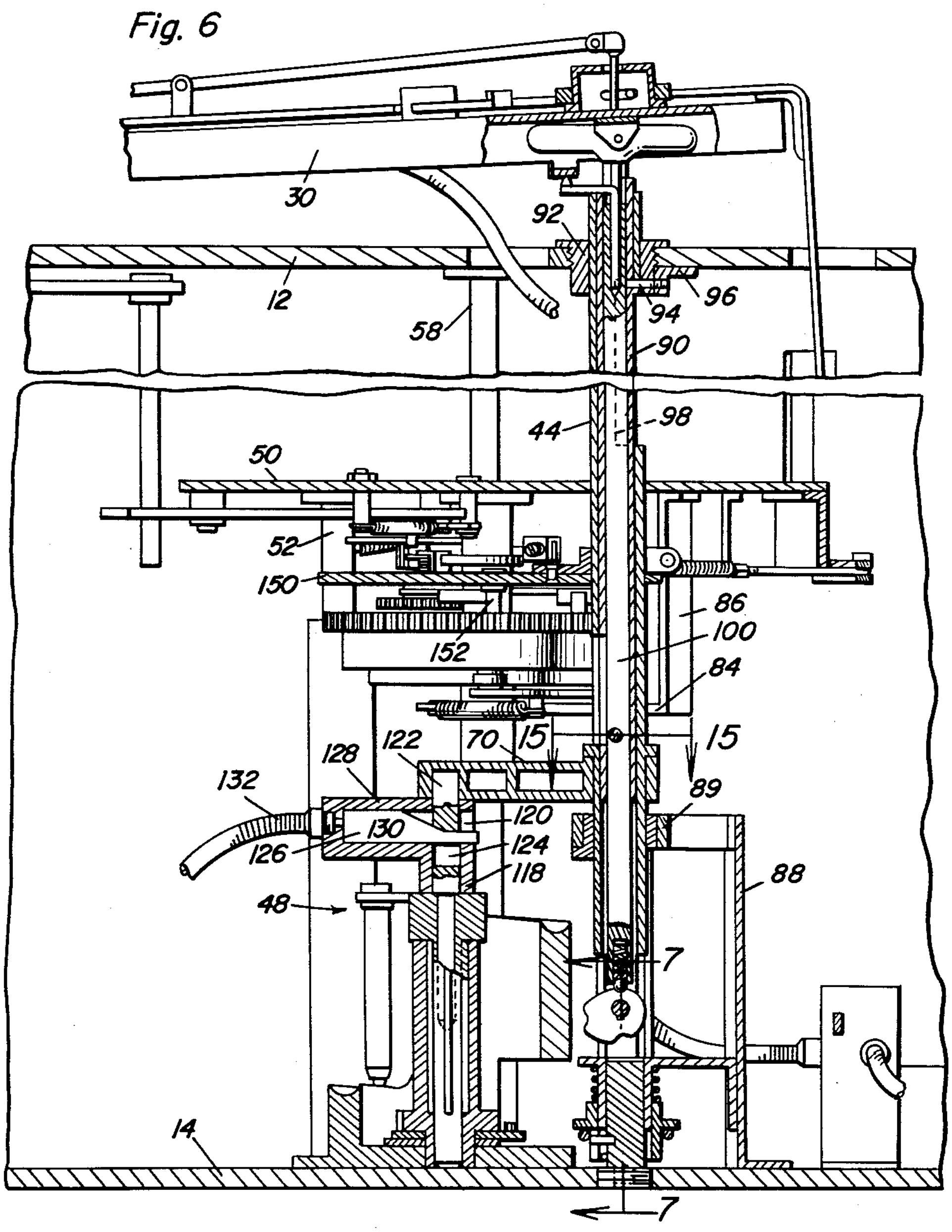
FIGURE 6 is a vertical transverse sectional view taken substantially upon the plane indicated by the section line 6—6 of FIGURE 4, parts being broken away and shown in section, this view being taken substantially at right angles to that of FIGURE 5, and showing the tone arm in its normal vertical position and tilted downward for playing the top side of a record carried by the turntable.

As seen best in FIGURES 3 and 6 the tone arm 30 has a flat top wall 40, a pair of flat parallel side walls 42 and an open bottom, being pivoted for vertical tilting to the furcations 42 on the upper end of a vertically extending tubular support post 44, by horizontal trunnions or pins 46. The support post is caused to move vertically by the vertical movement and to rotate or oscillate about its vertical axis by the horizontal movement, carrying with it the tone arm which is also capable of an independent vertical tilting about the horizontal axis of the pins 46.

By a compensating mechanism designated generally by the numeral 48 and which is fully described in my prior Patents No. 2,809,841 and 2,949,307, the support post and tone arm are automatically vertically elevated step-by-step, each time a record is played and changed in order to compensate the vertical position of the tone arm for the accumulating stack of records upon the turntable whereby the tone arm and its stylus will always be at the same relative vertical position with respect to a record being played thereby.

Figure 4:
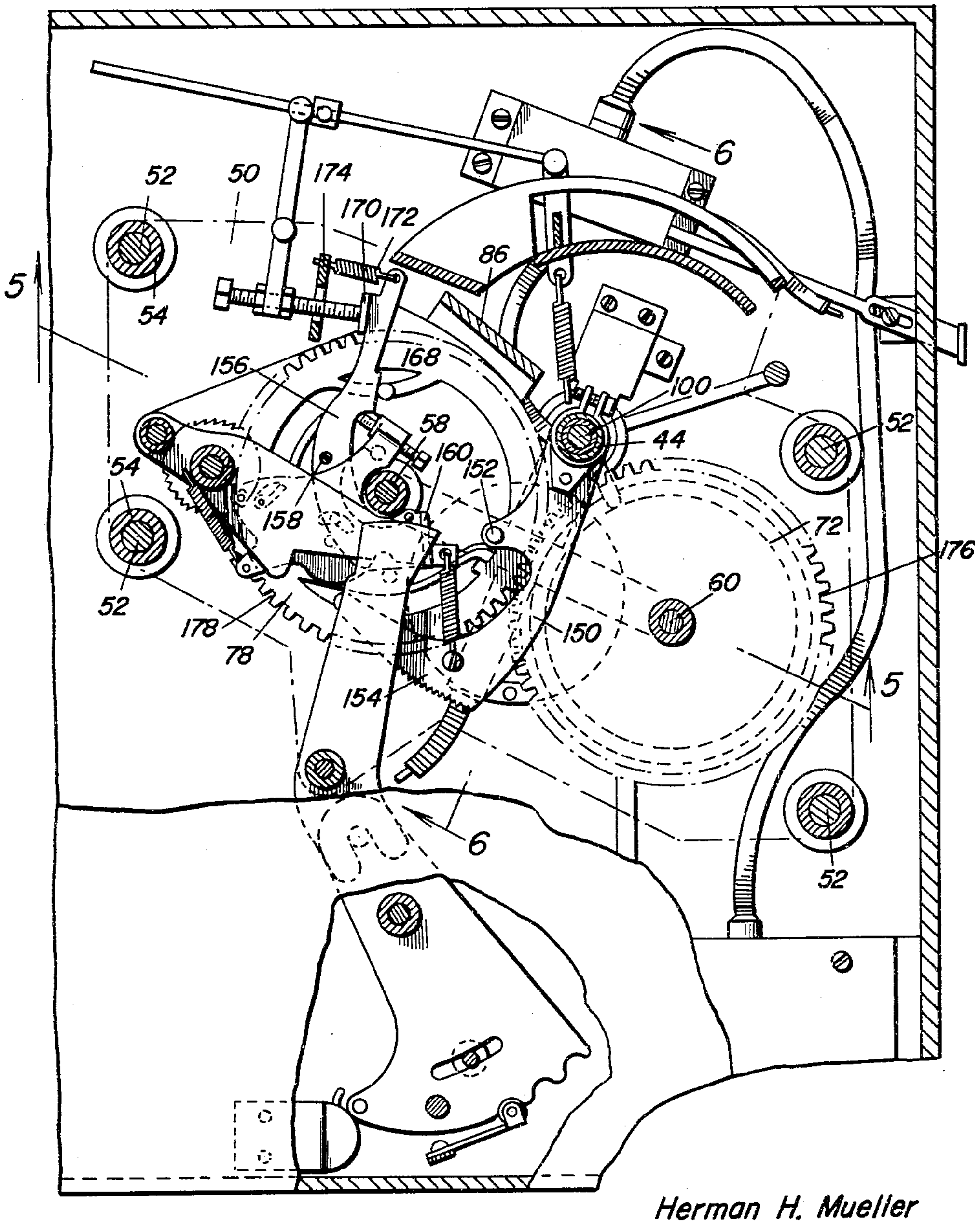
FIGURE 4 is a fragmentary horizontal sectional view taken substantially upon the plane indicated by the section line 4—4 of FIGURE 5 and looking downwardly upon the tilting, horizontal and vertical movements of the invention.
Figure 5:
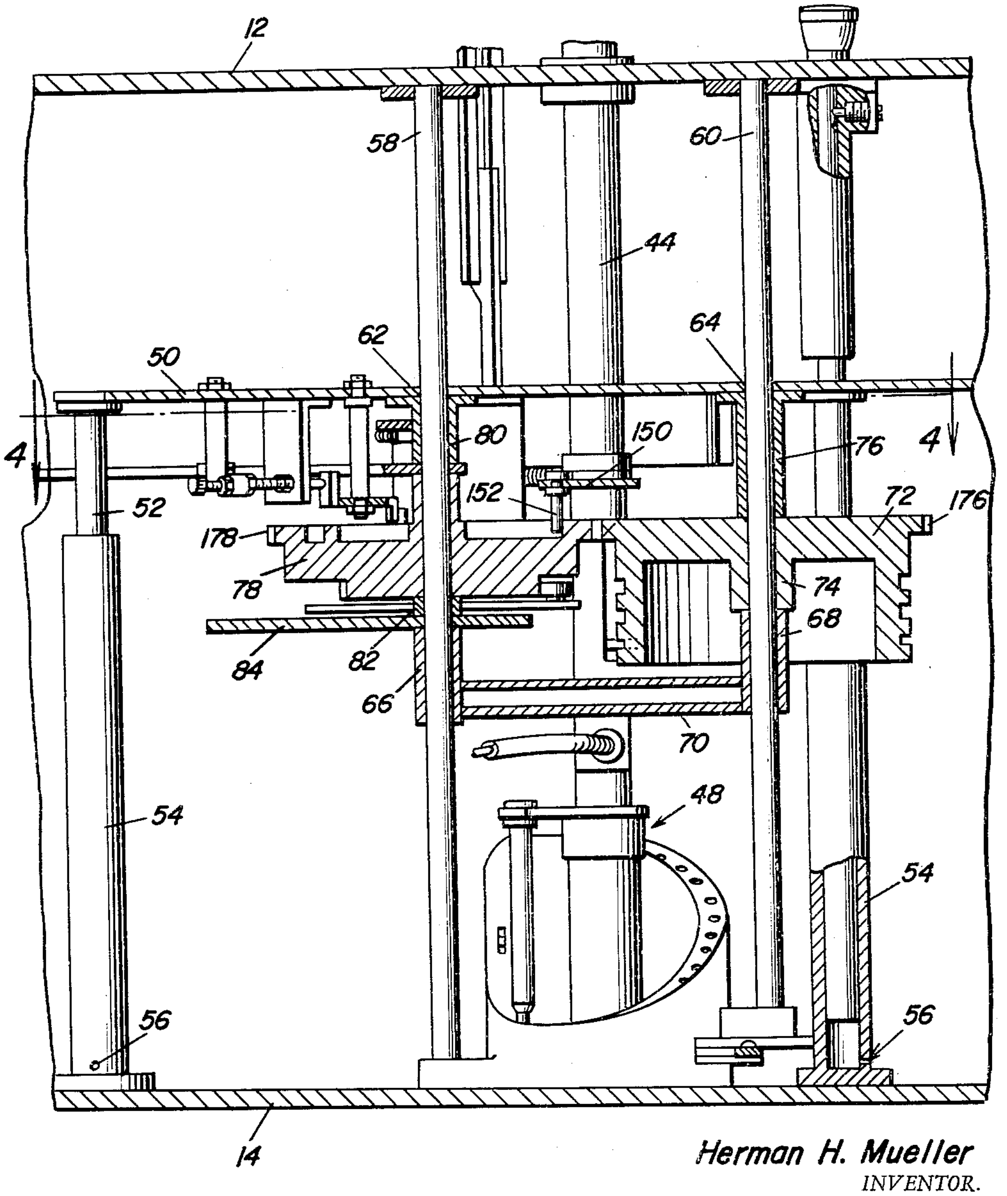
FIGURE 5 is a fragmentary vertical transverse sectional view through the phonograph record player in accordance with this invention, being taken substantially upon the plane indicated by the section line 5—5 of FIGURE 4, parts being broken away and shown in section.

A horizontally disposed platform 50, see FIGURES 4–6 is guidingly disposed within the cabinet 10 for vertical movement by any suitable number of supporting rods 52, secured to the underside of the platform, four such rods being shown in FIGURE 4. These rods have their lower ends slidable within stationary support cylinders 54 mounted upon the base 14 and provided with air vent passages 56 to prevent a dash pot effect. The lower ends of the support rods 52 comprise plungers or pistons slidable in the support cylinders, or may be provided with plunger or pistons.

Secured within the cabinet, as by being fastened to the top and bottom walls thereof, are a pair of stationary guide rods 58 and 60. The platform 50 has suitable apertures 62 and 64 by which it is slidable upon the guide rods. By means of bushings or tubular members 66 and 68, at its opposite ends, a crosshead 70 is mounted for vertical sliding movement upon the guide rods.

A tilting movement cam 72, see FIGURE 5, which directly controls the vertical movement of the tone arm, is freely rotatably and vertically slidable upon the guide rod 60 by means of a hub 74. The hub rests directly upon the upper end of the bushing 68, while a spacer and supporting sleeve 76 is slidable upon the rod 60 and abuts the cam 72 and the platform 50.

A horizontal movement cam 78, see FIGURE 5, which directly controls the horizontal swinging movement of the tone arm is likewise freely rotatable and slidable vertically upon the rod 58, suitable spacer and support sleeves 80 and 82 being provided upon the rod 58 between the cam 78 and the bushing 66 and the platform 50. A horizontal bracket 84, see also FIGURE 6 is journaled upon the rod 58 and has a vertical arm 86 secured to the platform 50 and serves to further brace and rigidify the members 50 and 70.

By the foregoing construction, vertical movement of the cross head 70 will result in corresponding vertical travel of the platform 50 which is fixedly positioned relative to the cross head and is carried thereby.

Mounted upon the bottom wall 14, is a stationary standard 88 having a journal bearing 89 in its upper end which guidingly and slidingly receives the support post 44. The latter is rotatably and slidably received upon a stationary vertical sleeve 90.

At their upper ends, see FIGURE 6, the sleeve 90 and the support post 44 extend through the top wall 12 being journaled therein by the bushing 92. A setscrew or locking pin 94 carried by a bracket or lug 96 mounted on the top wall 12 extends through a slot 98 in the support post 44 and engages and secures the sleeve 90 whose lower end terminates adjacent the bearing 89. As shown in dotted lines in FIGURE 6, the slot 98 extends a suitable distance both axially and circumferentially of the support post 44 to allow the necessary vertical and horizontal oscillatory motion required for the vertical and horizontal swinging movement of the tone arm.

Vertically slidable within the sleeve 90 is the tone arm tilting rod 100. The structure and arrangement of the tilting rod and its associated mechanism is disclosed and claimed in my prior Patent No. 2,841,400, forms no part of the invention claimed herein and therefore need not be further described. The arrangement is such that the tone arm may be vertically tilted upon its supporting pins 46 by which it is pivoted to the support post 44, upon vertical movement of the tilting rod 100 under the operation of the tilting cam 72.

Figure 8:
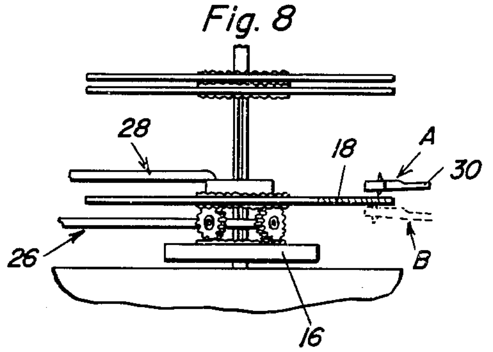
FIGURES 8–10 are diagrammatic views, corresponding respectively to FIGURES 9–11 of my copending application Serial No. 359,082, now Patent No. 2,949,307 of August 16, 1960, partly in elevation and partly in section and showing the different vertical and tilting positions of the tone arm for selectively playing records automatically in three different manners.
Figure 9:
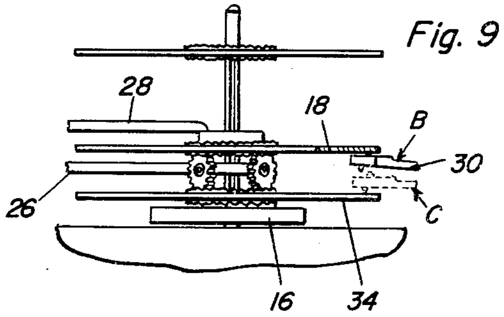
Figure 10:
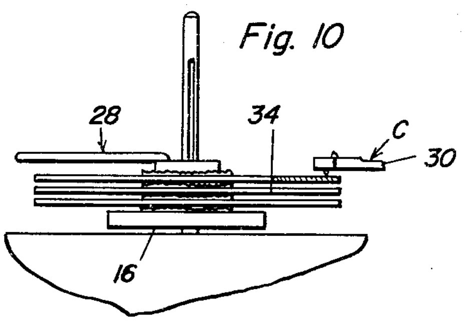

Reference is next made to the diagrammatic views of FIGURES 8–10, which disclose the different vertically adjusted positions of the tone arm during the automatic or manual operation of the record player.

FIGURE 8 shows the position assumed by the tone arm when it is desired to automatically play the top and bottom sides of a record 18, while the latter is supported upon and driven by the supporting and driving assembly 26. The tone arm is first elevated by the position A of FIGURE 8, above the record supported by the assembly 26. The tone arm is then tilted downwardly to play the sound groove upon the top side of the record. After the top side of the record has been played in this manner the tone arm is vertically lowered from the position A to the position B of FIGURE 8. The tone arm is then tilted upward to play the sound track on the underside of the record.

FIGURE 9 shows the tone arm position when the sound track upon the underside of a record is to be played when the record 18 is supported upon the assembly 26 and the sound groove upon the top side of the records to be played when that record is supported, as at 34, upon the top of the turntable 16 or the stack of records placed thereon. In the position of FIGURE 9 the tone arm remains in the same vertically adjusted position as that described above in connection with position B of FIGURE 8. In the position of FIGURE 9, the tone arm is tilted upwardly to the position shown at B, this being identical with the position B of FIGURE 8, to play the underside of the record carried by the supporting and driving assembly 26. Thereafter, the tone arm is tilted downwardly to the position shown at C whereupon the top side of the record 18, after the latter has been lowered to the turntable in the position of the record 34, is then played.

FIGURE 10 shows the position of the tone arm when it is desired to play records in a conventional manner, by successively dropping the records from a stack 22 mounted upon the spindle 20 to the turntable 16, and playing the top side of the record only when the latter rest upon the turntable. In this mode of operation, corresponding to the conventional operation of the well known record player, the supporting and driving assembly and the pressure head assembly 26 and 28, respectively, are withdrawn to one side of the turntable of the record player and remain idle. In this manner of playing records automatically, the tone arm is positioned at the same vertical position as employed in the playing of records in the manner indicated in FIGURE 9. In this position, the tone arm is inclined downwardly to the position shown in FIGURE 6, this being the same position seen in FIGURE 9, and the top side of the record is played.

In summary, from the foregoing three manners of automatically playing records, it will be seen that the tone arm is positioned vertically at the same position, as shown in FIGURE 6, for the playing of either top or bottom sides of records except when the top side of the record is played as the latter is supported upon the supporting and driving assembly 26 as in FIGURE 8. The tone arm then being in the elevated vertical position indicated at A.

During the above mentioned automatic playing of records, in the manner indicated in FIGURES 8 and 9, it is understood that the supporting and driving assembly 26 and the pressure arm assembly 28 are operated automatically and in timed relation to the operation of the other elements of the automatic record player. In addition, the pressure arm assembly serves to maintain the record 18 in firm contact with the supporting and driving assembly to prevent any possible slippage between the turntable, records stacked thereon, the supporting and driving assembly rollers and the record 18 carried thereby.

In addition to the automatic playing of records in accordance with the manners indicated in FIGURES 8–10, it is also possible to manually play records with this apparatus. For that purpose, the records are individually placed manually upon the turntable, with the tone arm placed in its normal vertical position, as shown in FIGURE 6, and the tone arm is then applied and withdrawn from the record manually, as suggested in FIGURE 10.

In order to place the tone arm in the position A of FIGURE 8, in order to play the top side of a record 18 mounted upon the supporting and driving assembly 26, it is necessary to vertically elevate the crosshead support post and tone arm relative to the compensating mechanism 48.

Depending from the cross head 70 is a sleeve 118, see FIGURE 6 in particular, having a hollow lateral extension and a longitudinal slot 120 diametrically alined with the opening from the sleeve into the hollow extension. The plunger 122 is slidable in the sleeve and has a longitudinal diametrical slot 124 alined with the sleeve slot 120. Slidable in the lateral extension 118 is a cam 126 having a pair of vertically and horizontally spaced upper and lower surfaces 128 and 130. The cam is slidably adjustable transversely of the sleeve and plunger by a flexible cable control assembly indicated generally by the numeral 132. When the cam is adjusted as shown in FIGURE 6, the lower surface 130 is interposed between the bottom edge of the slot 120 in the sleeve 116 and the top edge of the slot 124 in the plunger 122 whereby the cross head 70 will be in its lowered position relative to the sleeve for lifting by the latter. This position of the tone arm is the normal playing position.

In this position of the wedge 126, the tone arm is positioned in the two playing positions B of FIGURE 8; or the positions B or C of FIGURE 9; or the position C of FIGURE 10, for the purposes and operation set forth in my prior Patent No. 2,949,307 and as set forth hereinafter.

When the wedge 126 is actuated or shifted by the cable assembly 132 to cause the upper cam surface 128 to be positioned within the plunger slot 124, the plunger 122 and the cross head supported thereby will be elevated relative to the sleeve 118. Thus, the tone arm carried by its support post 44 will be temporarily lifted above its normal position. This is the position of FIGURE 9 of my last mentioned patent, and the position A of FIGURE 8 to play top side of records carried and driven by the supporting and driving assembly 26.

The wedge 126 is thus disposed only when the tone arm is to be elevated from the position B of FIGURE 8 to the position A therein, for playing the top side of a record supported upon the assembly 26.

The mechanism for operating the cable assembly 132 is synchronized with the various organizations and instrumentalities forming the automatic record player, and is fully disclosed and claimed in my last mentioned patent. A detailed explanation of this mechanism has therefore been omitted as being unnecessary to an understanding of the invention as disclosed and claimed herein.

*Horizontal movement*

The horizontal movement controls the horizontal swinging of the tone arm from its idle or rest position on the record player outside of the diameter of the records upon the spindle to a position within the circumference of a record for playing the same and thereafter inside the sound track of the record after the record has been played. This movement includes the horizontal movement cam 78 and an operative connection between this cam and the tone arm support post 44 whereby the latter is oscillated about its vertical axis under the control of the cam to impart the desired horizontal swinging movements to the tone arm.

A horizontal swing lever 150, see in particular FIGURES 4–6, is rigidly secured to the support post 44, for oscillatory movement therewith, being disposed within the cabinet 10 and below the plate 50 and lying above the horizontal movement cam 78. This lever has a depending pin 152 which rests in and is operated by a cam track upon the top surface of the cam 78. Thus, as the cam 78 is rotated, by any suitable means in properly timed relation to the actuation of the other instrumentalities of the record player, corresponding synchronized horizontal swinging movements will be imparted to the tone arm by the horizontal movement cam. It will be particularly noted that the operative connection between the tone arm, the horizontal swing lever and the horizontal movement cam will be unaltered despite vertical adjustments of the tone arm since the platform 50 which carries the horizontal and vertical movement cams 72 and 78 will move as a unit with the tone arm and the horizontal swing lever.

At the opposite end from its connection with the support post, the horizontal swing lever 150 has a lateral extension with an arcuately extending circumferentially toothed portion 154 which is adapted to be operatively engaged with a conventional form of reset mechanism whereby when the tone arm has completed its playing of the sound track of a record, and is disposed at the central portion of the record inside the sound track, the tone arm will be oscillated as the stylus or needle of the tone arm travels in the oscillating reset groove of the record. Since this reset mechanism is of conventional design and merely serves to energize the appropriate instrumentality of the record player to cause the tone arm to be lifted from the record, and move horizontally to its withdrawn position to one side of the record in anticipation for the next inward movement of the tone arm for playing the next record, further explanation regarding the same appears to be unnecessary. Since the horizontal swing lever, the record changer mechanism and their cooperative action are conventional, and in themselves form no part of the present invention, further illustration and description are deemed to be unnecessary and therefore are omitted from this application.

The horizontal movement of this invention, in accordance with the conventional horizontal movement of record players in general, also includes a limit lever 156 which is pivoted at 158 to the platform 50. This lever in the form illustrated in FIGURES 4 and 5, at one end portion, is provided with a flange 160 which is adapted as set forth hereinafter to be selectively positioned for engagement by the pin 152 of the horizontal swing lever, whereby the limit lever, by engagement of the pin against the flange will limit radial travel of the pins 152 in the cam groove of the cam 78 and consequently of the swing lever towards the center of the horizontal movement cam. This limiting of the limit lever upon the horizontal swing lever serves to position or index the stylus of the tone arm for proper setting down upon the sound track, of a record for beginning the playing of that sound track.

In the conventional limit lever construction, there are two stop recesses, corresponding to the positioning or indexing of a tone arm for playing two sizes of records, as for example 10 inch and 12 inch records. In accordance with this invention, however, the flange 160 permits a very large number of settings to properly index or position the tone arm stylus for selectively playing seven inch, ten inch, or twelve inch records, or any sizes of records.

The other or actuated end 168, of the lever 156 is modified from the conventional construction by the addition thereto of actuated flange 170, by which the limit lever is adjustably actuated by a gauging or indexing mechanism forming no part of the invention claimed but disclosed and claimed in my prior Patent No. 2,900,192.

It will be seen that although the horizontal swing lever employed in the horizontal movement of this invention is unaltered from conventional design, the limit lever is modified from conventional design by the addition of the abutments or stops at one end and by the provision of an actuated flange at the other end.

At its extremity, the limit lever has attached thereto a tension spring 172 suitably secured to any desired form of bracket or lug 174 whereby the limit lever is urged into a position for causing a selected one of the notches or recesses to engage the pin on the horizontal swing lever; or to cause an appropriate portion of the flange 160 to perform its function.

Referring now especially to FIGURES 4 and 5, it will be seen that the tilting movement cam 72 and the horizontal movement cam 78 are provided with external ring gears 176 and 178 respectively, by means of which these cams are constantly in mesh with each other to maintain at all times, a fixed synchronized relation with each other.

Power can be applied to either gears 176 or 178 from the conventional source of power for the record player in any conventional manner. Since this arrangement forms no part of the invention claimed herein, illustration or further discussion of the same is considered superfluous.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In an automatic phonograph record player, a turntable and means for driving the same, a supporting and driving assembly operatively supported and driven by the turntable for supporting and driving a record in vertically spaced relation to the turntable, said turntable and said supporting and driving assembly having a positive, interlocking, toothed driving connection therebetween, a tone arm and a horizontal movement for swinging the same towards and from the turntable, means for vertically positioning the tone arm selectively above and below a record supported upon the supporting and driving assembly and for selectively positioning the tone arm between records supported on the turntable and on the supporting and driving assembly for selectively playing the adjacent sound tracks of said records, means for causing the tone arm to selectively set down upon the sound track of the adjacent side of a record supported upon the supporting and driving assembly and the adjacent sound tracks of records mounted on the turntable and on the supporting and driving assembly.

References Cited in the file of this patent

UNITED STATES PATENTS

| | | |
|---|---|---|
| 2,526,188 | Andres | Oct. 17, 1950 |
| 2,601,986 | James et al. | July 1, 1952 |
| 2,628,843 | Comstock | Feb. 17, 1953 |
| 2,661,217 | Bidinger | Dec. 1, 1953 |
| 2,729,455 | Mueller | Jan. 3, 1956 |